United States Patent [19]

Cok

[11] Patent Number: 4,942,517
[45] Date of Patent: Jul. 17, 1990

[54] ENHANCED INPUT/OUTPUT ARCHITECTURE FOR TOROIDALLY-CONNECTED DISTRIBUTED-MEMORY PARALLEL COMPUTERS

[75] Inventor: Ronald S. Cok, Rochester, N.Y.

[73] Assignee: Eastman Kodak Company, Rochester, N.Y.

[21] Appl. No.: 105,836

[22] Filed: Oct. 8, 1987

[51] Int. Cl.$^5$ .............................................. G06F 15/16
[52] U.S. Cl. ................................. 364/200; 364/228.3; 364/231.9; 364/239.7
[58] Field of Search ... 364/200 MS File, 900 MS File

[56] References Cited

U.S. PATENT DOCUMENTS

| 3,984,819 | 10/1976 | Anderson | 364/200 |
|---|---|---|---|
| 4,381,542 | 4/1983 | Binder et al. | 364/200 |
| 4,426,679 | 1/1984 | Yu et al. | 364/200 |
| 4,456,956 | 6/1984 | El-Gohary et al. | 364/200 |
| 4,484,263 | 11/1984 | Olson et al. | 364/200 |
| 4,514,807 | 4/1985 | Nogi | 364/200 |
| 4,633,472 | 12/1986 | Krol | 364/200 |
| 4,783,730 | 11/1988 | Fischer | 364/200 |
| 4,785,395 | 11/1988 | Keeley | 364/200 |

OTHER PUBLICATIONS

IEEE Article, 1985, entitled "The Mesh with a Global Mesh: A Flexible, High-Speed Organization for Parallel Computation", by D. Carlson.
IEEE Article, 1986, entitled "M$^2$-Mesh: An Augmented Mesh Architecture", by Tsair-Chin Lin and D. I. Moldovan.

Primary Examiner—Gareth D. Shaw
Assistant Examiner—Debra A. Chun
Attorney, Agent, or Firm—Raymond L. Owens

[57] ABSTRACT

A toroidally-connected distributed-memory parallel computer having rows of processors, with each processor having an independent memory. The computer includes at least one common I/O channel adapted to be connected to a single row of processors by buffering mechanisms. Each buffering mechanism is associated with one processor of the single row of processors.

5 Claims, 5 Drawing Sheets

ENHANCED INPUT/OUTPUT ARCHITECTURE FOR TOROIDALLY-CONNECTED DISTRIBUTED-MEMORY PARALLEL COMPUTERS

TECHNICAL FIELD OF THE INVENTION

The present invention relates to enhancing the input and output capability and efficiency of a toroidally-connected distributed-memory parallel computer.

BACKGROUND OF THE INVENTION

In an effort to achieve further processing power for computing, many designers of computers are turning to parallel processing. There is, however, a wide variety of computer architectures which employ parallel processing.

Parallel processing computers can be divided into two general types: those which have shared-memory processors and those which have distributed-memory processors. Shared-memory computers involve multiple processors which can access the same memory. In contrast, distributed-memory computers have processors with private independent memories. Communication between distributed-memory processors is achieved by a communications interconnection. The present invention is specifically concerned with distributed-memory parallel processing computers, and more particularly to a toroidally-connected computer.

The performance of a toroidally-connected distributed-memory parallel computer is limited by several factors: the total memory of the computer, the number of processors in the computer, the communication between processors required by a given problem, and the speed at which data can be moved in and out of the computer. The first two factors are relatively insignificant since, in most parallel computers, the number of processors and their memory can be varied readily to suit whatever need exists. The third factor, that of processor intercommunication, is a topic of widespread and intensive research (see "M² Mesh: An Augmented Mesh Architecture"; Lin & Moldovan; Proceedings of First International Conference on Parallel Processing, p. 306; and "The Mesh With A Global Mesh: a flexible high-speed organization for parallel computation"; Carlson; Proceedings of First International Conference on Supercomputing, p. 618.). For large data set applications (such as image processing or data base examination), the input/output (I/O) requirements may well be the critical factor constraining the overall throughput of the parallel computer. In this specification the term toroidal will be understood to include the term mesh. As shown in FIG. 2, there is a toroidal array of processors wherein each processor is connected to four neighboring processors.

There are two general parallel processing modes frequently used: distributed and pipelined. Distributed processing requires that every processor perform the same operation on a different subset of the data. Pipelined processing requires that every processor perform a different operation on the same set of data. Toroidally-connected computers are particularly suitable for operating in both modes but they still have problems.

Attempts to provide adequate I/O generally involve providing each processor node with an I/O channel and having a controller write sequentially through the I/O channel to the various processors. This approach lends itself to distributed processing, but is relatively expensive in terms of chip cost, and circuit board area, (see U.S. Pat. No. 4,514,807; "Parallel Computer"; Nogi; also the commercial products "Connection Machine" from Thinking Machines, "Hypercube" from Intel Scientific Computers, and the "Ncube/10" from Ncube.). Furthermore, the device feeding the I/O channels imposes still another bottleneck.

An alternative approach sometimes taken is to perform I/O only with one processor and use the interconnection network of the parallel processor to further distribute the data. This approach is inexpensive but suffers from bandwidth constraints.

Both of these general approaches are incapable of performing I/O with multiple data sources or destinations. This limits their usefulness when co-operating with other computers and data storage or generation devices. Neither of these approaches can be equally effective for both pipelined and distributed parallel processing. Neither of these approaches can offer flexible I/O rates. Since one of the prime advantages of a parallel system is its performance flexibility (adding processors to improve computational performance), it is important to scale the I/O performance and hardware in a similar fashion.

The object of this invention is to provide a more effective architecture for a toroidally-connected distributed-memory parallel computer which obviates the above-noted problems.

SUMMARY OF THE INVENTION

This object is achieved in a toroidally-connected distributed-memory parallel computer having rows of processors, each processor having an independent memory, the improvement comprising:

(a) at least one common I/O channel;

(b) a row of such processors (I/O) being adapted to be connected to such common I/O channel; and (c) a plurality of buffering mechanisms, each one of which being associated with a particular processor of said I/O row and adapted to connect such processor to the I/O channel in such a manner that any given I/O processor of the I/O row can access its buffer mechanism independently of the access to such buffer mechanism by the I/O channel, and independently of access to the buffer mechanisms of other processors in said I/O row, whereby data distribution is efficiently facilitated.

Since a mesh or toroid can be changed in size or rotated without destroying its topological structure, any reference to a row of processors can also be considered as a reference to a column of processors.

BRIEF DESCRIPTIONS OF THE DRAWINGS

MODES OF CARRYING OUT THE INVENTION

Figure 1:
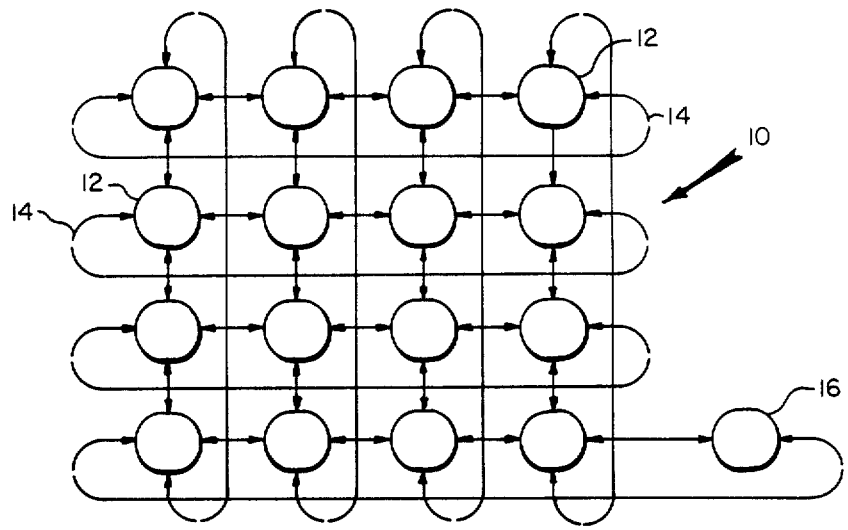
FIG. 1 shows a prior art toroidally-connected computer with a control processor inserted in one row.

The invention is concerned with an architecture for performing improved input/output operations with a toroidally-connected parallel computer. FIG. 1 shows a prior art arrangement 10 comprising many processors 12, which are interconnected with communications channels 14, and a node controller 16 inserted in one row. Each processor 12 has an independent memory. The node controller 16 serves as an entry point to the closed surface of the toroidal processor. Any row of the array can be chosen as an "I/O" row. The number of these rows will depend on the particular application intended.

Figure 2:
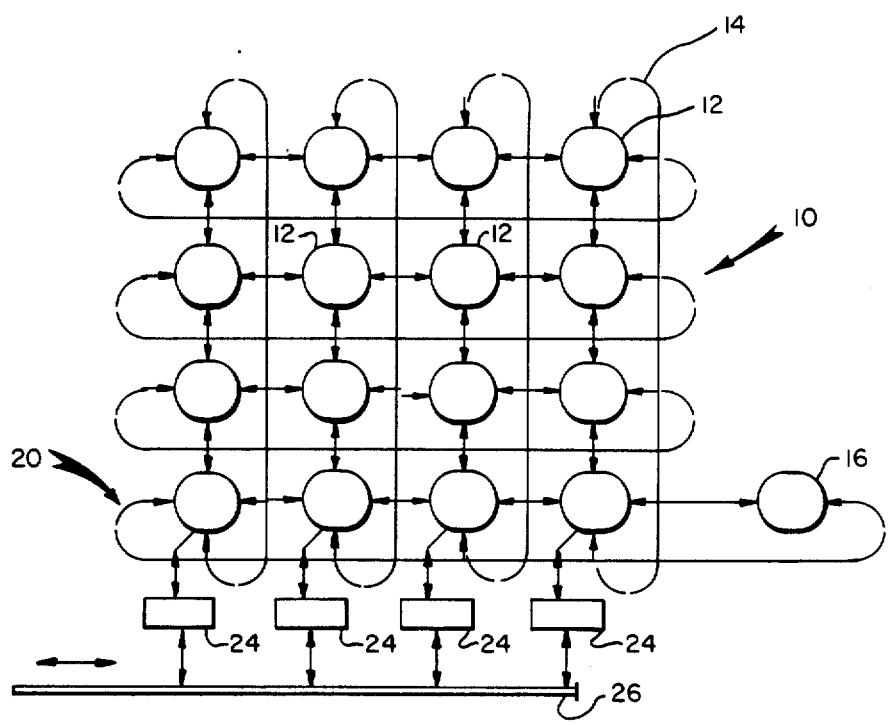
FIG. 2 shows a toroidally-connected distributed-memory parallel computer in accordance with the invention using an input/output (I/O) row with an I/O channel, and associated I/O buffering mechanisms with one such mechanism being associated with each processor in the I/O row.

FIG. 2 shows a particular I/O row connected in accordance with the invention. This row of processors 20 can then be accessed directly from an I/O channel 26. An I/O channel is any mechanism by which large amounts of information can be quickly transferred. Typically the I/O channel will be a standard computer bus shown in FIGS. 4 and 5 or a parallel I/O port. An I/O row will have every processor connected directly to a different buffering mechanism 24. Each buffering mechanism provides storage and control means so that the I/O channel can communicate at high speed to any one of the buffers independently. Any given processor communicates with its associated buffer mechanism to complete the input or output cycle. It is necessary that any processor be able to access its associated buffer independently of I/O channel or processor activity with other buffer mechanisms. Other than the associated processor, only the I/O channel has access to the buffer; other processors can only communicate with their own buffer. Because both the I/O channel and a processor can attempt to communicate with a buffer simultaneously, means must be provided to arbitrate their communication. Either the I/O channel or the processor can be designated master of the buffer and must include the appropriate arbitration mechanisms. It can also be useful if the buffer is made large enough so that a processor can operate on one set of data while the I/O channel communicates another data set.

Figure 3:
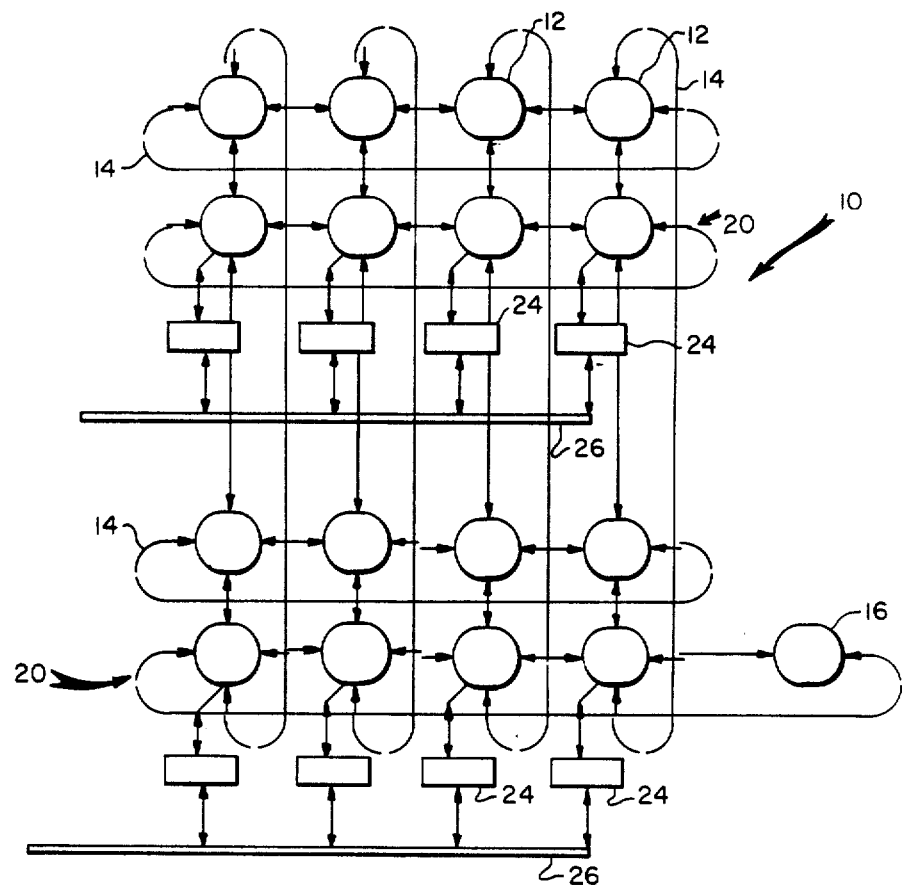
FIG. 3 shows a toroidally-connected computer in accordance with the invention including two I/O processor rows connected to separate I/O channels.

The optimal combination of I/O channels and number of processors on each channel for any particular application is a matter of design consideration. FIG. 3 shows a configuration with two rows used for I/O. It is also possible for multiple rows to be connected to the same I/O channel.

Figure 4:
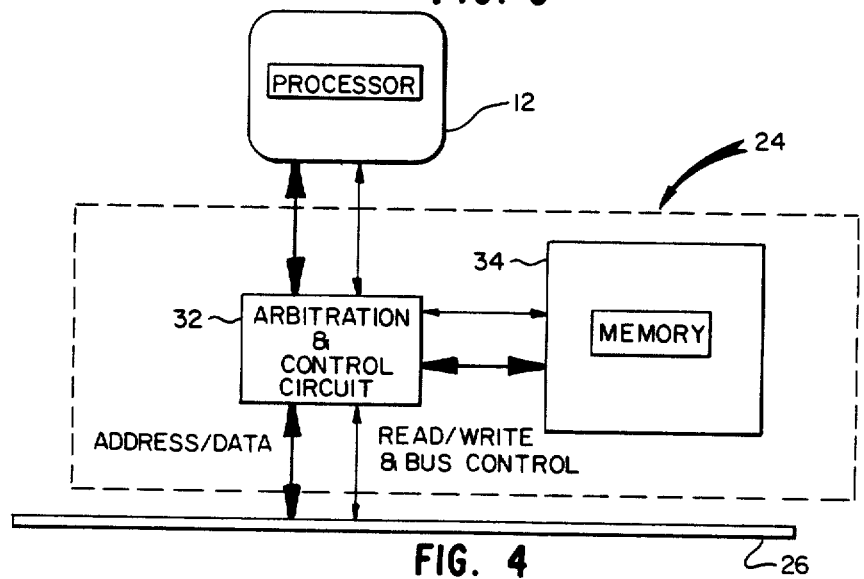
FIG. 4 shows an I/O buffering mechanism which can be used in accordance with the invention and which uses conventional memory, arbitration, and bussing methods.

Turning now to FIG. 4, there is shown a mechanism 24 which includes arbitration and control circuit 32, and memory 34. This arrangement permits access to the memory 34 from either the processor 12 or the channel 26. Such an arrangement 24 has been built and successfully used with standard random-access memory (RAM) for the memory 34 and with standard bus request/grant and data read/write signals implementing the arbitration and control circuit 32. The processor is the master of the circuit 24 and reads and writes information to the memory. For example, when the I/O channel 26 desires to communicate with the memory 34, it first signals a request to the processor, which then ceases communication with the memory 34, and returns an acknowledge signal to the I/O channel 26.

Figure 5:
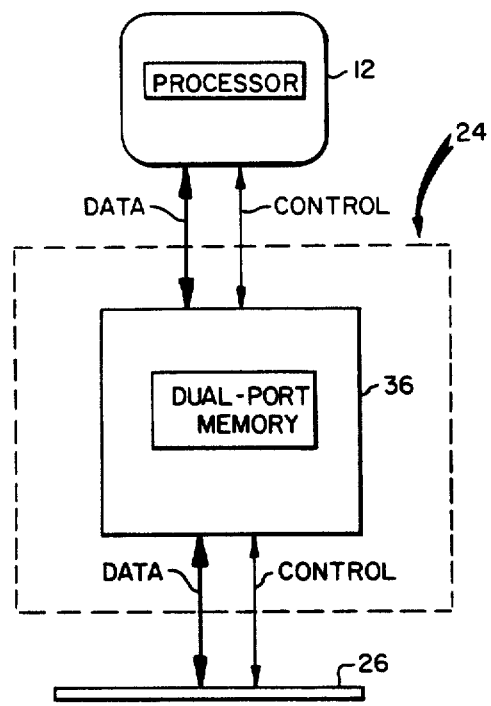
FIG. 5 shows another I/O buffering mechanism which can be used in accordance with the invention and which uses a conventional dual-ported memory.

In FIG. 5, a dual-port memory 36 provides a doubled-buffered memory. A double-buffered memory is a memory which two separate mechanisms (in this case the I/O channel and the processor) can access simultaneously and independently. This obviates the need for special arbitration and control circuitry such as shown in FIG. 4.

Figure 6:
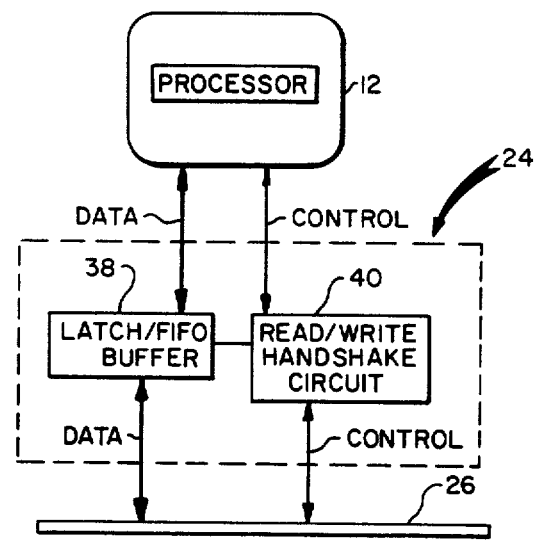
FIG. 6 shows still another I/O buffering mechanism adapted to connect a high-speed parallel data I/O port to a processor using a bi-directional latch of first-in first-out (FIFO) buffer together with handshake control logic.

In FIG. 6, there is shown another mechanism 24 which includes a latch/FIFO memory buffer 38 which briefly operates as follows. Data is presented at the buffer 38 by either the processor or the port depending on the direction of data transfer. The FIFO (first-in, first-out buffer), on receipt of a data-available signal will read the data into the buffer. On receipt of a data request signal, the FIFO will write the data out. Although the port and processor (using the above-mentioned handshake signals) could communicate directly, the FIFO allows the processor or port to transfer data at different rates for a short time until the buffer is full.

Figure 7:
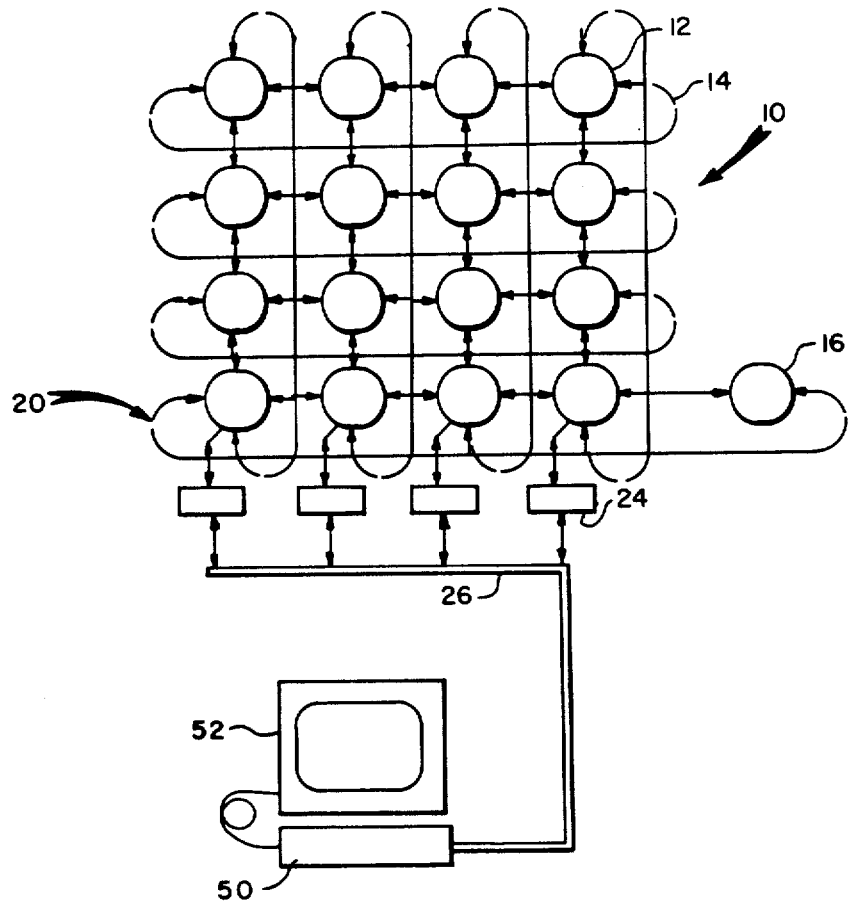
FIG. 7 shows an embodiment of the invention similar to FIG. 3 with one I/O row connected to an I/O channel realized as a conventional bus.
Figure 8:
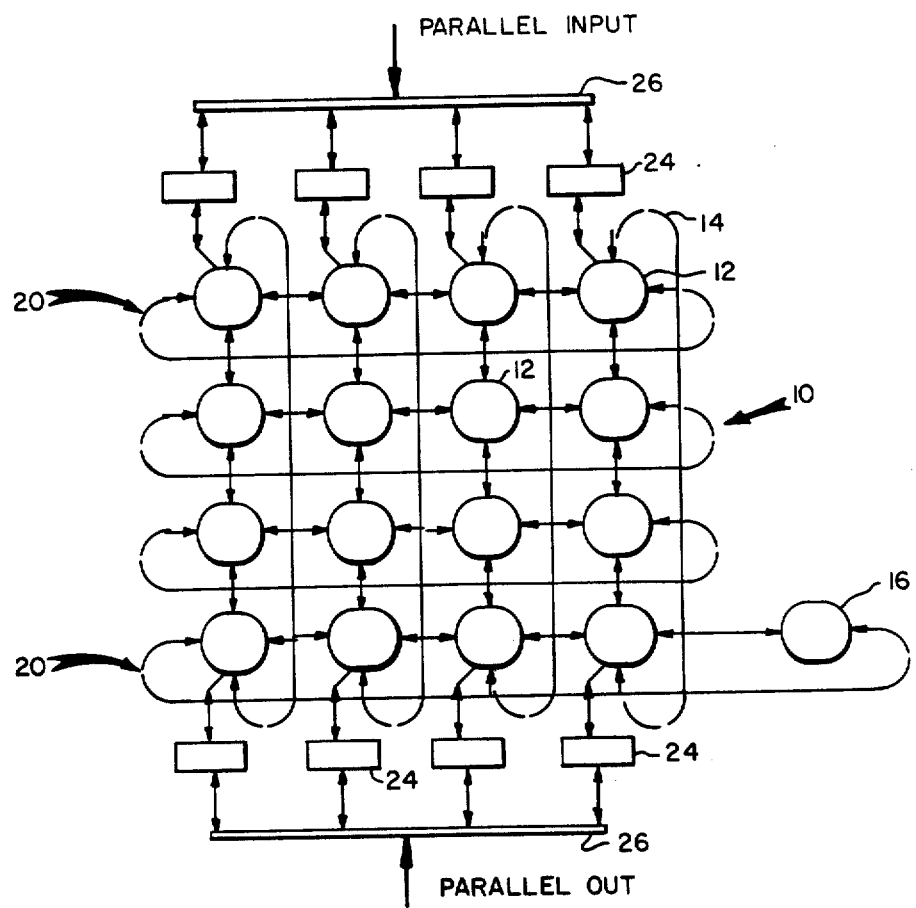
FIG. 8 shows an embodiment of the invention with the parallel processor, and I/O row connected to a high-speed parallel input and a second I/O row connected to a high-speed parallel output.

The various elements which make up the invention can be arranged in a modular fashion and then interconnected to provide either distributed or pipelined operations. For example, a single printed-circuit board can be used to provide an I/O row, with an associated channel incorporating a row of processors together with their buffers and control mechanism 24. The processors can also be provided on separate printed-circuit boards. In FIG. 7, a distributed mode of operation is realized. In FIG. 8, the various elements are selected to provide a structure which can be employed in both distributed and pipeline modes. Two separate I/O channel printed-circuit boards are used in this arrangement. Any number of I/O boards may be placed on the bus and interconnected as a row of the array of processors. Any of the rows of the array may have a set of I/O boards and an associated channel.

In FIG. 7, we see the channel 26, in the form of a bus coupled to a computer 50. A display device 52 is also connected to the computer 50. This structure was constructed and worked well in both the distributed and pipeline processing mode. "Inmos Transputer" single-chip computers manufactured by the INMOS Ltd., Co., of Bristol, U.K., were used as the processors. The control node was also the same transputer. The mechanisms 24 were dynamic random-access memories. The I/O channel 26 was realized with an industry-standard VME bus. The host computer 50 used was a "Sun" workstation. Arbitration was achieved in the conventional way by a defined bus protocol using bus request/grant, read/write, data available/request, and acknowledge signals.

Three separate printed-circuit boards, each with different amounts of memory associated with each processor, have been realized. In addition, one of the boards implemented an I/O row with four processors as shown in FIG. 4. These boards were interconnected as described above to build variously-sized computers ranging from four processors to ninety-six processors with various row lengths and column heights in a toroidal array. These computers have demonstrated performance of up to seventy times that of the workstation host, while handling large data sets, without encountering a significant communication bottleneck to the parallel processor.

Using this invention, the I/O structure of an array of processors can be readily changed. For a pipelined application, as shown in FIG. 8, one I/O channel at one row can serve as a data input and a second I/O channel as the data output. Data then flows through the structure, being operated on at each stage. If faster or slower data throughput is required, the array (and associated I/O rows) are made wider or narrower while keeping the number of processors constant. Alternatively, if the processing rate changes but the I/O throughput rate remains constant, the array can be made taller or shorter by eliminating or adding non-I/O rows of processors. Adding or subtracting processors changes the processing rate, but does not add I/O hardware. This provides cost-effective and flexible performance for both computing power and I/O throughput.

As discussed above, the FIG. 8 can be used equally well for distributed processing. The different I/O channels can be used as data sources and/or destinations.

Having multiple I/O channels also offers an additional capability. The entire processor array can act as a switching network. Data can be read in from a source I/O channel and directed to another.

ADVANTAGES

This invention offers improved I/O performance for toroidally-connected distributed-memory parallel computers. It represents a practical and flexible implementation of a multiple-instruction multiple-data (MIMD) parallel processor with a cost-effective balance between processors and I/O hardware requirements. The invention utilizes an array of processors. By making the array wider or narrower so that more or fewer processors accept data on an I/O row (the buffering hardware must be able to accommodate this rate) the data rate can be changed. A simple torus or mesh can have an arbitrary number of data I/O paths by using multiple rows or columns, with at least one row or column for each I/O path. The above considerations provide great flexibility in meeting various needs with large I/O requirements for both pipelined and distributed processing.

The buffers associated with a common row can also act as a local cache for data storage whose size can be adapted by expanding or adding I/O rows to meet the requirement of different applications. Providing the high-speed interface over a row permits the individual processors and their interconnects to be relatively slower, simpler, and cheaper. In addition, if multiple I/O channels are used, the processor array can act as a simple switching network.

The invention has been described in detail with particular reference to certain preferred embodiments thereof, but it will be understood that variations and modifications can be effected within the spirit and scope of the invention.

I claim:

1. In a toroidally-connected distributed-memory parallel computer having rows and columns of processors, wherein each processor has an independent memory and is connected to four neighboring processors, the improvement comprising:
   (a) at least one common I/O channel;
   (b) a plurality of buffering mechanisms, each being connected to such I/O channel and to only one corresponding processor in a given row of processors; and
   each such processor of said given row being connected to only one corresponding buffer mechanism in such a manner that it can access its buffer mechanism independently of the access to such buffer mechanism by the I/O channel, and independently of access to the buffer mechanisms corresponding to other processors in said given row.

2. The computer of claim 1 wherein each buffering mechanism includes a dual-port memory.

3. The computer of claim 1 wherein each buffering mechanism includes a latched FIFO buffer.

4. The computer of claim 1 including first and second I/O channels, each channel being associated with a different given row of processors and a plurality of buffering mechanisms, each buffering mechanism being connected to only one of the I/O channels and a processor of a given row associated with such I/O channel.

5. The computer of claim 4 wherein the first I/O channel receives input data in parallel and delivers it to its I/O row and the second I/O channel received processed data from its I/O row and transmits it as a parallel output.

* * * * *